(12) United States Patent
Riley et al.

(10) Patent No.: US 8,402,377 B2
(45) Date of Patent: *Mar. 19, 2013

(54) SYSTEM AND METHOD FOR EMBEDDING A VIEW OF A VIRTUAL SPACE IN A BANNER AD AND ENABLING USER INTERACTION WITH THE VIRTUAL SPACE WITHIN THE BANNER AD

(75) Inventors: Sean Riley, San Diego, CA (US); John Donham, San Diego, CA (US)

(73) Assignee: MP 1, Inc., Solana Beach, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/461,338

(22) Filed: May 1, 2012

(65) Prior Publication Data
US 2012/0221417 A1    Aug. 30, 2012

Related U.S. Application Data

(63) Continuation of application No. 11/898,861, filed on Sep. 17, 2007, now Pat. No. 8,196,050.

(51) Int. Cl.
*G06F 3/048* (2006.01)
(52) U.S. Cl. .................. 715/757; 715/848; 715/850
(58) Field of Classification Search .................. 715/742, 715/757, 759, 706, 848, 850
See application file for complete search history.

(56) References Cited

U.S. PATENT DOCUMENTS

| | | | |
|---|---|---|---|
| 5,525,765 A | 6/1996 | Freiheit | 181/30 |
| 5,736,982 A | 4/1998 | Suzuki et al. | 345/330 |
| 5,950,202 A | 9/1999 | Durward et al. | 707/10 |
| 6,009,458 A | 12/1999 | Hawkins et al. | 709/203 |
| 6,219,045 B1 | 4/2001 | Leahy et al. | 345/331 |
| 6,289,248 B1 | 9/2001 | Conley et al. | 607/59 |
| 6,323,857 B1 * | 11/2001 | Mielekamp et al. | 345/419 |
| 6,493,001 B1 | 12/2002 | Takagi et al. | 345/759 |
| 6,791,549 B2 | 9/2004 | Hubrecht et al. | 345/473 |
| 6,961,060 B1 | 11/2005 | Mochizuki et al. | 345/473 |
| 7,454,715 B2 | 11/2008 | Chen et al. | 715/850 |
| 7,534,169 B2 | 5/2009 | Amaitis et al. | 463/39 |
| 7,577,847 B2 | 8/2009 | Nguyen et al. | 713/186 |

(Continued)

FOREIGN PATENT DOCUMENTS

| | | |
|---|---|---|
| EP | 0 991 009 | 4/2000 |
| WO | WO 2005/015505 | 2/2005 |

(Continued)

OTHER PUBLICATIONS

James, Daniel and Walton, Gordon, Editors, "2004 Persistent Worlds Whitepaper", IDGA Online Games SIG, <archives.igda.org/online/IGDA_PSW_Whitepaper_2004.pdf>, 82 pages.

(Continued)

*Primary Examiner* — Omar Abdul-Ali
(74) *Attorney, Agent, or Firm* — Pillsbury Winthrop Shaw Pittman LLP

(57) ABSTRACT

A system and method for providing a view of a virtual space to a user in a banner ad of a webpage. This enables an advertiser to provide content that is not merely static or scripted, but instead enabled provision of content through a web ad that represents activity within a virtual space (e.g., interactions of other users with the virtual space, content that changes based on current or recent events, etc.) in real time (or near real time). The provision of a virtual space in a web ad may be more effective than conventional web ad content.

21 Claims, 6 Drawing Sheets

U.S. PATENT DOCUMENTS

| | | | |
|---|---|---|---|
| 7,587,276 B2 | 9/2009 | Gold et al. | 701/211 |
| 7,587,338 B2 | 9/2009 | Owa | 705/26 |
| 7,681,114 B2 | 3/2010 | Ambrosino et al. | 715/201 |
| 7,788,323 B2 | 8/2010 | Greenstein et al. | 709/204 |
| 7,797,261 B2 | 9/2010 | Yang | 706/45 |
| 7,827,507 B2 | 11/2010 | Geise et al. | 715/850 |
| 7,904,577 B2 | 3/2011 | Taylor | 709/230 |
| 8,027,784 B2 | 9/2011 | Geelen | 701/201 |
| 8,066,571 B2 | 11/2011 | Koster et al. | 463/42 |
| 8,196,050 B2 | 6/2012 | Riley et al. | 715/757 |
| 2001/0049787 A1 | 12/2001 | Morikawa et al. | 713/156 |
| 2002/0049814 A1* | 4/2002 | Yoo | 709/205 |
| 2002/0054163 A1 | 5/2002 | Yamada et al. | 345/848 |
| 2002/0082910 A1* | 6/2002 | Kontogouris | 705/14 |
| 2002/0112033 A1* | 8/2002 | Doemling et al. | 709/219 |
| 2002/0169670 A1* | 11/2002 | Barsade et al. | 705/14 |
| 2003/0008713 A1 | 1/2003 | Ushiro et al. | 463/42 |
| 2003/0046689 A1 | 3/2003 | Gaos | 725/34 |
| 2003/0064705 A1 | 4/2003 | Desiderio | 455/412 |
| 2003/0231212 A1 | 12/2003 | Slemmer et al. | 345/771 |
| 2004/0014527 A1 | 1/2004 | Orr et al. | 463/43 |
| 2004/0230458 A1 | 11/2004 | Takayama et al. | 705/3 |
| 2005/0033511 A1 | 2/2005 | Pechatnikov et al. | 701/210 |
| 2005/0091111 A1* | 4/2005 | Green et al. | 705/14 |
| 2005/0160141 A1* | 7/2005 | Galley et al. | 709/204 |
| 2005/0210395 A1 | 9/2005 | Wakita et al. | 715/753 |
| 2006/0015814 A1 | 1/2006 | Rappaport et al. | 715/733 |
| 2006/0211462 A1 | 9/2006 | French et al. | 463/1 |
| 2006/0223635 A1 | 10/2006 | Rosenberg | 463/37 |
| 2006/0265483 A1 | 11/2006 | Wang et al. | 709/223 |
| 2006/0287815 A1 | 12/2006 | Gluck | 701/208 |
| 2007/0020603 A1 | 1/2007 | Woulfe | 434/350 |
| 2007/0021213 A1 | 1/2007 | Foe et al. | 463/42 |
| 2007/0027628 A1 | 2/2007 | Geelen | 701/213 |
| 2007/0050716 A1 | 3/2007 | Leahy et al. | 715/706 |
| 2007/0082738 A1 | 4/2007 | Fickie et al. | 463/42 |
| 2007/0083323 A1 | 4/2007 | Rosenberg | 701/200 |
| 2007/0190494 A1 | 8/2007 | Rosenberg | 434/11 |
| 2007/0288598 A1 | 12/2007 | Edeker et al. | 709/217 |
| 2008/0052054 A1 | 2/2008 | Beverina et al. | 703/6 |
| 2008/0082311 A1 | 4/2008 | Meijer et al. | 703/24 |
| 2008/0094417 A1 | 4/2008 | Cohen | 345/632 |
| 2008/0134056 A1 | 6/2008 | Shuster | 715/757 |
| 2008/0221790 A1 | 9/2008 | Min et al. | 701/209 |
| 2008/0280684 A1 | 11/2008 | McBride et al. | 463/42 |
| 2009/0036216 A1 | 2/2009 | Ratcliff | 463/42 |
| 2009/0040186 A1 | 2/2009 | Esenther | 345/173 |
| 2009/0077158 A1 | 3/2009 | Riley et al. | 709/202 |
| 2009/0077463 A1 | 3/2009 | Koster | 715/234 |
| 2009/0077475 A1 | 3/2009 | Koster et al. | 715/757 |
| 2009/0307226 A1 | 12/2009 | Koster et al. | 707/10 |
| 2009/0307611 A1 | 12/2009 | Riley | 715/757 |
| 2010/0058235 A1 | 3/2010 | Borst | 715/810 |
| 2010/0094547 A1 | 4/2010 | Geelen et al. | 701/209 |
| 2010/0095213 A1 | 4/2010 | Koster et al. | 715/733 |
| 2012/0059881 A1 | 3/2012 | Koster et al. | 709/204 |

FOREIGN PATENT DOCUMENTS

| | | |
|---|---|---|
| WO | WO 2009/039080 | 3/2009 |
| WO | WO 2009/039084 | 3/2009 |
| WO | WO 2009/039085 | 3/2009 |
| WO | WO 2009/152074 | 12/2009 |
| WO | WO 2009/152077 | 12/2009 |
| WO | WO 2010/042783 | 4/2010 |

OTHER PUBLICATIONS

WoWWiki, Paid Character Transfer FAQ (US), Feb. 23, 2007, Blizzard Entertainment, <www.mowwiki.com/Paid_Character_Transfer_FAQ_(US)>, 6 pages.

Linden Research, Inc., "Second Life Wiki: Second Life Work/FAQs", Nov. 9, 2009, Linden Research, Inc., <http://wiki.secondlife.com/wiki/Second_Life_Work/FAQs>, 2 pages.

Blizzard Entertainment, Inc., World of Warcraft Manual 2004, Blizzard Entertainment, <willishome.com/Manual.pdf>, 114 pages.

Kumar, Sanjeev, et al., "Second Life and the New Generation of Virtual Worlds", *Computer*, vol. 41, No. 9, Sep. 2008, pp. 46-53, doi: 10.1109/MC.2008.398, http://ieeexplore.ieee.org/stamp/stamp.jsp?tp=&arnumber=4623222&isnumber=4623205, 8 pages.

Wilson, Tracy V., "How World of Warcraft Works", Nov. 16, 2007, HowStuffWorks.com, http://electronics.howstuffworks.com/world-of-warcraft.htm, Apr. 13, 2011, 4 pages.

* cited by examiner

SYSTEM AND METHOD FOR EMBEDDING A VIEW OF A VIRTUAL SPACE IN A BANNER AD AND ENABLING USER INTERACTION WITH THE VIRTUAL SPACE WITHIN THE BANNER AD

RELATED APPLICATIONS

This application is a continuation of U.S. patent application Ser. No. 11/898,861, entitled "SYSTEM AND METHOD FOR EMBEDDING A VIEW OF A VIRTUAL SPACE IN A BANNER AD AND ENABLING USER INTERACTION WITH THE VIRTUAL SPACE WITHIN THE BANNER AD," and filed Sep. 17, 2007, which is hereby incorporated by reference into the present disclosure in its entirety.

FIELD OF THE INVENTION

The invention relates to embedding a view of a virtual space within in a banner ad of a webpage, and enabling a user to interact in real time with the virtual space through the banner ad.

BACKGROUND OF THE INVENTION

A "web banner," or "banner ad," is a form of advertising on the Internet (and/or some other network). This form of online advertising entails embedding an advertisement into a web page that may be viewed by a web browser. It may be intended to attract traffic to a website by linking users to the web site of the advertiser. Such advertisements are generally constructed from an image (GIF, JPEG, PNG), or can be viewed by invoking a client within the web browser (e.g., a JavaScript program, Shockwave, Flash) that can generate a display with movement by running a script. Banner areas in which banner ads are placed are usually in a high-aspect ratio shape (i.e. either wide and short, or tall and narrow) hence the reference to banners. Banner ads are typically placed on webpages that have interesting content, such as a news article or an opinion piece, a blog, an email client, and/or other interesting content.

Typically, a web banner is displayed when a web page that references the banner is loaded into the web browser. This event is known as an "impression". When the viewer clicks on the banner, the viewer is directed to the website advertised in the banner. This event is known as a "click through".

SUMMARY

One aspect of the invention relates to a system and method for embedding a dynamic, real-time view of a virtual space in a banner ad of a webpage. This may enable the provision of content to users through web ads that is not merely static or scripted, but instead represents activity within a virtual space instanced remotely from the users viewing the web ads (e.g., interactions of other users with the virtual space, content that changes based on current or recent events, etc.) in real time (or near real time). The embedding of a view of a virtual space in a web ad may be more effective than providing conventional web ad content alone in a web ad. For example, the virtual space may include an online game (e.g., a virtual world), and the view of the virtual space in the banner ad may provide a guest, and/or spectator view of the online game. The view of the virtual space and/or other features of the banner ad may further enable a user to enter the online game, if after viewing the game the user finds the game interesting and wishes to participate. As another example, the virtual space may include a virtual concert and the view of the virtual space includes a visual depiction of various aspects of the concert (e.g., the crowds online at the venue, a band performing on-stage, a crew preparing the venue, etc.).

In some embodiments of the invention, a virtual space may comprise a simulated space (e.g., a physical space) instanced on a server, the virtual space being accessible by a client located remotely from the server such that the client receives information related to a dynamic, real-time visual representation of the virtual space, and formats a display that corresponds to the visual representation. The simulated space may have a topography, express ongoing real-time interaction by the user, and/or include one or more objects positioned within the topography that are capable of locomotion within the topography.

A webpage may be characterized as a resource of information that may take one or more forms. For example, one form of a webpage may include a file (e.g., a HTML file) that includes content and formatting information that dictates the manner in which the content should be conveyed to a user (e.g., size information, font information, layout information, etc.). The content may include actual content (e.g., text, images, audio, etc.), or it may include references to locations where the actual content can be accessed (e.g., network locations, such as a URL). Another example of a form of a webpage is a display generated for viewing by the user based on the file. The display may be generated by assembling the content included in the file in the manner dictated by the formatting information.

The webpage display may simply convey information to a user. In some instances, the webpage display may enable the user to interact with the content of the webpage. For example, the webpage file may dictate the presentation of an interface to the user in the webpage display that enables the user to enter information to the webpage, change the size and/or layout of one or more fields and/or objects in the webpage display, control one or more multi-media objects in the webpage display, and/or otherwise interact with the webpage. The interface provided in the webpage display may include, for example, selectable buttons, expandable menus, drag-and-drop controls, and/or other interfaces that enable interaction with the webpage. In some instances, the webpage display may present "links" to information. Selection of a link by a user may initiate a display of the information associated with the link. A link may be associated, for example, with another webpage, with certain content in the webpage associated with the link, with a different type of file, with a communication mechanism that enables communication with a third party (e.g., a link that initiates an email, a chat session, a text message, etc.), or other information.

Embedding a dynamic, real-time view of a virtual space in a webpage may include providing information and/or instructions in the webpage file that dictate the generation of the view in the webpage display. The instructions may include a location of the view in the webpage (e.g., the location of the banner area), a size of the view (e.g., the size of the banner area, and/or the size of the view within the banner area), and/or information related to the view. The information related to the view may include an identification of the virtual space to be viewed, a network access location that corresponds to an instance of the virtual space (e.g., a network location of a server instantiating the virtual space), a predetermined location within the virtual space to be viewed, and/or other information related to the view. The instructions may include instructions to invoke a space client configured to receive view information (e.g., from a server instantiating the virtual space) and to format the view of the virtual space for display in the banner area. In some instances, the webpage file may include a copy of the space client (or a reference to a network location from which the space client is downloaded as content).

In some embodiments of the invention, a system configured to embed a dynamic, real-time view of a virtual space in a webpage may include one or more of a web browser, one or more web servers, one or more space servers, and/or other components. The web browser may request a webpage from the one or more web servers. The one or more web servers may provide the webpage to the web browser (e.g., by transmitting the webpage file to the web browser) and may embed a view of a virtual space within a banner area of the webpage such that when the web browser generates a display of the webpage, the view of the virtual space is displayed in the banner area. A user of the web browser may interact with the virtual space displayed in the banner area of the webpage in real-time and may view the real-time interaction of other users with the virtual space. This interaction may, in some instances, include providing commands to the virtual space that cause changes in the virtual space (e.g., object and/or character movement, sound emission, etc.), even though the virtual space is being instanced remotely from the web browser.

Upon receipt of a request for the webpage (or for information included therein) from the web browser, the one or more web servers may determine information related to the view of the virtual space to be presented in the banner area of the webpage. As was mentioned above, this information may include an identification of the virtual space to be viewed, a network access location that corresponds to an instance of the virtual space (e.g., a network location of a server instantiating the virtual space), a predetermined location within the virtual space to be viewed, and/or other information.

In some instances, the determination of some of this information related to the dynamic, real-time view of the virtual space may be "fixed." For example, the identity of the virtual space to be viewed may be the same, or "fixed," for each webpage that is served by the one or more web servers with the view of the virtual space embedded in the banner area. As another example, the predetermined location within the virtual space may be fixed for each webpage that is served with the view of the virtual space embedded in the banner area. In some instances, the determination of some or all of the information related to the dynamic, real-time view of the virtual space may be "variable." Variable information may include information that is determined on a per serve basis based on one or more parameters. These parameters may include, for example, demographic information, the particular webpage in which the view of the virtual space is being embedded, registration or privilege information (e.g., based on a previous registration, monetary compensation received from the user for registration/privileges, privileges earned by the user through past game-playing, etc.), and/or other information related to the user of the web browser and/or the web browser. Information related to the view of the virtual space that may be variable may include, for example, the identity of the virtual space, the predetermined location within the virtual space, and/or other information.

In some embodiments, the web server that transmits the webpage file to the web browser may determine some or all of the information and/or instructions related to the view of the virtual space. In some embodiments, the webpage file may include a network location at which information related to the view of the virtual space embedded in the banner area may be accessed. The network location may correspond to another one of the one or more web servers (e.g., an ad server that specifically serves advertising content, etc.), another file served by the web server transmitting the webpage file, and/or some other source of information related to the view of the virtual space embedded in the webpage. If the webpage file includes a network location at which information related to the view of the virtual space can be accessed, the web browser may transmit a request for the information to the network location. In response, a server that receives the request at the network location may determine and transmit information to the web browser related to the view of the virtual space to be embedded in the banner area. The information, which may be included in the webpage file and/or accessed at a network location indicated in the webpage file, may include: (i) instructions for the web browser to invoke the space client; and (ii) instructions for the space client to access the virtual space at the predetermined location in the virtual space (e.g., by contacting a space server instantiating the virtual space and receiving view information from the space server) to generate a display of view of the virtual space that corresponds to the predetermined location.

In response to the instructions for the space client to generate a dynamic, real-time view of the virtual space that corresponds to the predetermined location in the virtual space, the space client may request view information related to the view from a space server. The space server may be included in the one or more web servers that serve the webpage, or the space server may be a separate entity. The space server may be executing an instance of the virtual space and may implement the instance of the virtual space to determine the view of the virtual space at the predetermined location requested by the space client (according to the information received in the webpage file and/or in accordance with the webpage page file). The space server may determine view information that describes the determined view, and may transmit the view information back to the space client. The space client may format the view of the virtual space by assembling the view information, and the view may be displayed in the banner area of the webpage requested by the web browser.

These and other objects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
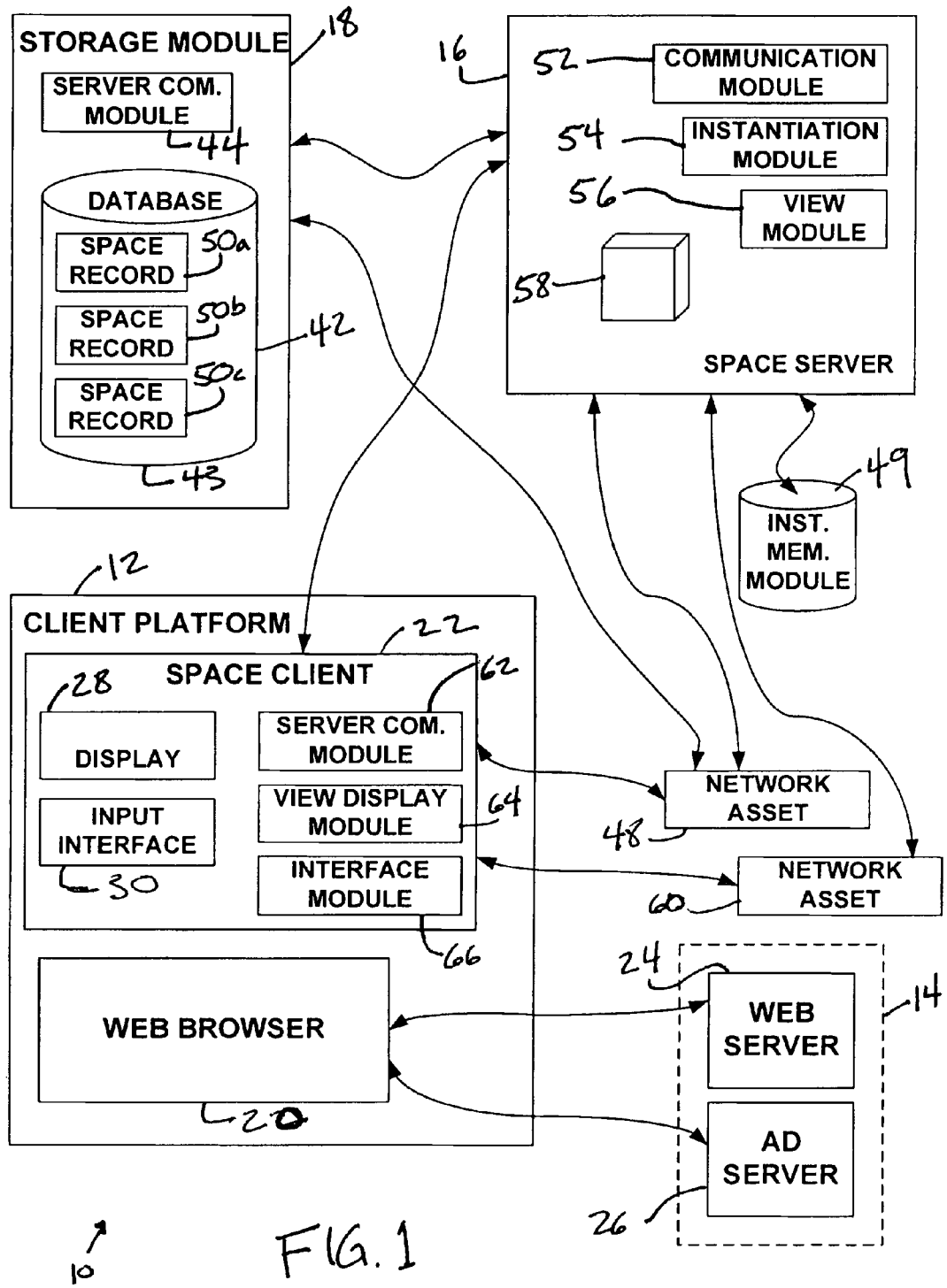
FIG. 1 illustrates a system configured to provide a view of a virtual space in a banner ad of a webpage, according to one or more embodiments of the invention.

FIG. 1 illustrates a system 10 configured to embed a dynamic, real-time view of a virtual space in a banner ad of a webpage. In some embodiments, the system may include a client platform 12, one or more web servers 14, a space server 16, and a storage module 18. The client platform 12 may implement a web browser 20 and a space client 22. One or more web servers 14 may include a web server 24 and an ad server 26 (and in some cases space server 16). In some embodiments, web browser 20 may request a webpage from web server 24, which serves the webpage. Web server 24 may transmit a webpage file to web browser 20 that corresponds to the webpage. The webpage file may include information and/or instructions that embed a dynamic, real-time view of the virtual space within a banner area of the webpage such that when web browser 20 generates a display of the webpage the dynamic, real-time view of the virtual space is displayed in the banner area. A user of web browser 20 may interact with the virtual space in the banner area of the webpage. This interaction may, in some instances, include providing commands to the virtual space that cause changes in the virtual space (e.g., object and/or character movement, sound emission, etc.).

As used herein, a "banner ad" may comprise advertising content that is served through the Internet (or some other network) for inclusion in a webpage display. For example, a banner ad may be served through a web ad system that includes a dedicated ad server that serves only ads (e.g., that are embedded in web pages served by other servers), or by a web ad system that is integrated with a server that serves webpages (or other content) as well as advertising content in the webpages. As used herein, a "banner area" may comprise any area in which a web ad may be embedded within a webpage. Although such areas are typically high-aspect ratio areas, it should be appreciated that in some instances this may not be the case. Further, a banner area may be confined to a relatively small area, or the banner area may be relatively large. As used herein, a "web server" may include any processing device (or devices) that serves information within one or more webpages over the Internet. As used herein, a "web browser" may comprise any processing client that reads webpage files and generates webpage displays. In some instances, a web browser may include more than one application working in cooperation to obtain and display content associated with a given webpage (e.g., a traditional browser and a plugin application). As used herein, the "Internet" may comprise the World Wide Web. However, it should be appreciated that the principles discussed herein with respect to the Internet may be applied in advertising systems implemented on other networks without departing from the scope of the disclosure.

Client platform 12 may include a computing platform that provides one or more processing and storage capabilities that enable client platform 12 to execute electronically readable instructions (e.g., code) to implement, for example, web browser 20 and space client 22. Client platform 12 may include a display 28, an input interface 30, and/or other components that provide an interface for a user of client platform 12 (e.g., a speaker, etc.). Display 28 may include a visual display that conveys information to a user (e.g., a display screen, a projector, indicator light(s), etc.). Input interface 30 may enable the user to input information to client platform 12 (e.g., a keyboard, a keypad, a switch, a knob, a lever, a touchpad, a touchscreen, a button, a joystick, a mouse, a trackball, etc.). Client platform 12 may include a desktop computing system, a gaming system, or more portable systems (e.g., a mobile phone, a personal digital assistant, a hand-held computer, a laptop computer, etc.). In some embodiments, client platform 12 may be formed in a distributed manner (e.g., as a web service).

As was mentioned above, web browser 20 may be implemented on client platform 12. Access to one or more webpages may be provided to the user of client platform 12 via web browser 20. To access a webpage, the user may input a network location (e.g., a URL, a network address, a file system address, etc.) associated with the webpage. In response to the input of the network location, web browser 20 may transmit a request from client platform 12 to the network location corresponding to the webpage. This request may be received at the network location by the one or more web servers 14, which serve the webpage.

In the embodiments illustrated in FIG. 1, one or more web servers 14 are illustrated as including two separate servers, web server 24 and ad server 26. It should be appreciated that this is for illustrative purposes only, as web server 24 and ad server 26 may in some cases be implemented in a single device (or a cooperating set of devices). Further, the division of functionality between web server 24 and ad server 26 in this disclosure is not intended to be limiting, as some of the functionality attributed to ad server 26 may be performed by web server 24 without departing from the scope of the invention, and vice versa. It should also be appreciated that in some instances, one or more web servers 14 may further include space server 16 (or space server 16 may even be implemented on a single device with one or both of web server 24 and ad server 26).

Web server 24 may be configured to receive requests for the webpage at the network location. Upon receipt of a request for the webpage (e.g., from web browser 20), web server 24 may transmit a webpage file that corresponds to the webpage back to the requesting entity. The webpage file may include content included in the webpage, and formatting information that dictates the manner in which the content should be conveyed to a user (e.g., size information, font information, layout information, etc.). The content in the webpage file may include actual content (e.g., text, images, audio, etc.), or it may include references to locations where the actual content can be accessed (e.g., network locations, such as a URL). The webpage file may include, for example, information related to one or more banner areas in the webpage in which one or more banner ads are to be displayed. The webpage file may further include content and/or formatting information related to the display of the banner ads, or information that enables web browser 20 to access the appropriate content and formatting information for the banner ad.

Information included in the webpage with respect to a given banner ad may include, for example, a network location (e.g., a URL, a network address, a file system address, etc) at which the content and formatting information may be accessed, a size of the banner area, a location of the banner area on the webpage, and/or other information. The network location may correspond to ad server 26, which serves the banner ad. As another example, the content and formatting information may be determined prior to transmission of the webpage file to web browser 20, and the webpage file may include the actual content (or references to specific content)

and formatting information, along with information such as the size and/or location of the banner area in the webpage.

Upon receipt of the information related to the given banner area, web browser 20 may transmit a request for the content and/or formatting information related to a banner ad corresponding to the given banner area (where such information was not included in the webpage file) to the network location indicated in the webpage file (e.g., a network location corresponding to ad server 26). Ad server 26 may receive the request and serve the banner ad by providing information to web browser 20 that enables web browser 20 to obtain the content of the banner ad. For example, ad server 26 may provide some or all of the ad content to web browser 20. In instances in which a dynamic, real-time view of a virtual space is to be embedded in the banner ad, the information provided by ad server 26 may include instructions to the web browser 20 to invoke space client 22, instructions to space client 22 related to the virtual space to be viewed and/or a predetermined location in the virtual space to be viewed, and/or other information related to embedding the dynamic, real-time view of the virtual space in the given banner area.

Information related to the dynamic, real-time view of the virtual space to be embedded in the banner ad, whether included in the webpage file or accessed at an access location indicated in the webpage file, may include a particular virtual space to be embedded in the banner ad (from among a plurality of spaces), a predetermined location within a virtual space to be viewed (e.g., a location corresponding to previous activities of the user within the virtual space), a level of interactivity with the virtual space enabled for web browser 20, and/or other information. In some instances, the determination of some of this information (by one or more of servers 16, 24, and 26) may be "fixed." For example, the particular virtual space to be viewed may be the same, or "fixed," for each webpage that is served by the one or more web servers 14 with the dynamic, real-time view of the virtual space embedded in the banner area. As another example, the predetermined location within the virtual space may be fixed for each webpage that is served with the dynamic, real-time view of the virtual space embedded in the banner area. In some instances, the determination of some or all of the information related to the view of the virtual space may be "variable." Variable information may include information that is determined on a per serve basis based on one or more parameters. These parameters may include, for example, demographic information, the particular webpage in which the dynamic, real-time view of the virtual space is being embedded, registration or privilege information (e.g., based on a previous registration, monetary compensation received from the user for registration/privileges, privileges earned by the user through past game-playing, etc.), and/or other information related to the user of the web browser and/or the web browser. Information related to the view of the virtual space that may be variable may include, for example, the particular virtual space to viewed in the banner ad (from among a plurality of spaces), the predetermined location within a virtual space to be viewed (e.g., a location corresponding to previous activities of the user within the virtual space), the level of interactivity with the virtual space enabled for the web browser, and/or other information.

The determination of variable information related to the dynamic, real-time view of the virtual space embedded in the banner area of the webpage may customize the view of the virtual space for the user. In some embodiments, when web browser 20 requests information related to the banner ad (e.g., from web server 24 and/or from ad server 26) web browser 20 may provide information to one or both of servers 24 and/or 26 related to one of more of the parameters enumerated above (e.g., in the form of "cookies"). This information may be implemented (by one or more of servers 16, 24, and/or 26) to provide a dynamic, real-time view of a virtual space that is specific to the user to attract the attention of the user, to build on past experiences of the user with a virtual space, and/or otherwise customize the dynamic, real-time view of the virtual space embedded in the banner ad.

As has been described above, customization of the dynamic, real-time view of the virtual space for the user may include determining a particular virtual space to be viewed and/or a predetermined location within a virtual space to be viewed (e.g., an avatar to be associated with the user), and/or determining other aspects of the view of the virtual space that customize the view. By way of non-limiting example, if servers 16, 24, and/or 26 determine (from information received from web browser 20) that the user has previously registered within a virtual space and already is associated with a character in that space, the instructions to web browser 20 may instruct space client 22 to format a view of the virtual space that is associated with the character (e.g., the predetermined location corresponds to the character) such that the user is enabled to view and interact with the virtual space through her previously associated character. On the other hand, if it appears to the servers 16, 24, and/or 26 that the user has not previously registered, then the instructions may instruct space client 22 to format a view of the virtual space that corresponds to a character that has not previously been associated with a user, and enables the user of web browser 20 to view and interact with the virtual space through this previously unassociated character. As another example, information related to the webpage in which the view of the virtual space is to be embedded may be implemented to determine the type of virtual space and/or locations in the virtual space that the user would be interested in. As yet another example, demographic information related to the user (e.g., sex, age, family status, income, occupation, etc.) and/or Internet usage habits (e.g., bookmarks, tags, frequently visited webpages, etc.) may be implemented to determine the type of virtual space and/or locations in the virtual space that the user would be interested in.

In some implementations, the instructions to web browser 20 to invoke space client 22 may include a copy of space client 22 that is downloaded to client platform 12 as an object (i.e., content) from ad server 26 (or as an object in the webpage file received from web browser 20). The download of the copy of space client 22 to client platform 12 may initiate invocation of the downloaded space client 22. The invoked space client 22 may then proceed by requesting access to the virtual space at the predetermined location, in accordance with the instructions received by web browser 20 related to the view of the virtual space.

In some implementations, the predetermined location may include a spatial coordinate within the virtual space. In some implementations, the predetermined location may include an object within the virtual space. The object may include a portal object (discussed further below) which may or may not be fixed positionally within the virtual space. The object may include an incarnation (e.g., an avatar, etc.) that is, or is to be, associated with the user. As will be discussed further below, space client 22 implements the instructions included in the information provided by ad server 26 to format a view of the virtual space for display in the given banner area.

Figure 2:
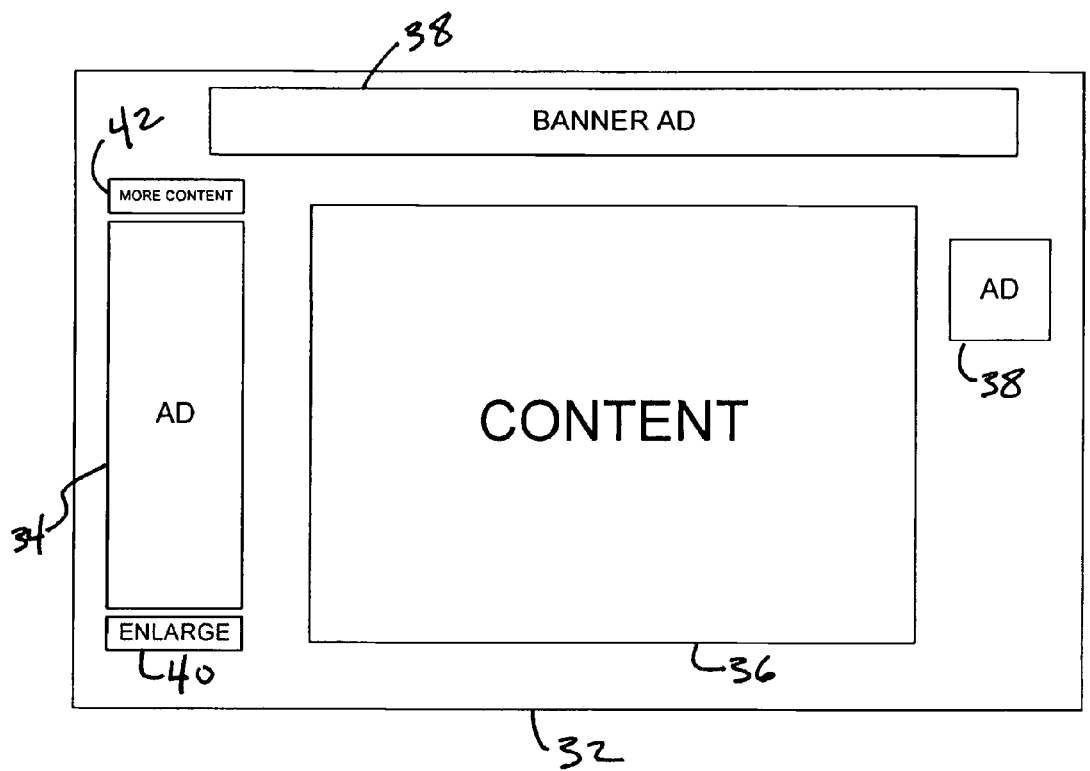
FIG. 2 illustrates a display of a webpage, in accordance with one or more embodiments of the invention.

Upon receipt of the information related to the view of the virtual space (e.g., from ad server 26, in the webpage file, etc.), and execution of the instructions included therein by web browser 20 and space client 22, a display of the webpage may be provided to a user with the view of the virtual space provided within the banner area of the webpage. For example, FIG. 2 illustrates an exemplary display 32 generated by web browser 20 and space client 22 to provide a dynamic, real-time view of a virtual space within a banner area 34 of a webpage. As can be seen, the webpage includes primary content 36. Primary content 36 may include the content for which a user accesses the webpage (e.g., an article, a multimedia object, an image, an audio file, etc.). Banner area 34 may be one of a plurality of banner areas 38 included in the webpage, to be served by an ad server (e.g., ad server 26). It should be appreciated that the dynamic, real-time view of the virtual space may not take up the entire area of banner area 34. Instead, banner area 34 may also include an interface and/or other content, as well as the dynamic, real-time view of the virtual space.

According to various embodiments of the invention, web browser 20 may enable the user of client platform 12 to expand a size of the display through which the dynamic, real-time view of the virtual space is provided (e.g., the size of banner area 34 initially). This expansion may be accomplished, for example, via one or more of a click-and-drag operation that enables the user to manually expand the size of the display through which the view of the virtual space is provided, a selectable button 40 that expands the display associated with the virtual space to a predetermined size, a selectable button 40 that provides the display associated with the virtual space in a separate display "window," or other mechanisms for enabling the user to expand the size of the display. Such a selection may also prompt space client 22 to further provide content associated with the virtual space that had previously been ignored or repressed to avoid interference with primary content 36 of the webpage (e.g., sound, visual effects, control over one or more aspects of the virtual space, etc.). In some embodiments, space client 22 may be prompted (by the user via a selectable button 42) to provide previously ignored content related to the virtual space, without expanding the display associated with the virtual space.

Returning to FIG. 1, following is a discussion of various components within system 10 (storage module 18, space server 16, space client 22, etc.) that actually format a dynamic, real-time view of a virtual space for display, which may then be provided within a banner area of a webpage as discussed above. It should be appreciated that the particulars of this discussion are not intended to be limiting, as the scope of the invention includes other implementations capable of providing views of virtual spaces.

System 10 is configured such that information related to a given virtual space may be transmitted from storage module 18 to space server 16, which may then instantiate the virtual space. Views of the virtual space may be generated by space server 16 from the instance of the virtual space being run on space server 16. Information related to the views may be transmitted from space server 16 to space client 22 to enable space client 22 to format the views for display to a user (e.g., in a banner area of a webpage). System 10 may implement a markup language for communication between components that enable access of a virtual space (e.g., storage module 18, space server 16, space client 22, etc.). Information may be communicated between these components via markup elements of the markup language. By virtue of communication between the components of system 10 in the markup language, various enhancements may be achieved. For example, information may be transmitted from storage module 18 to space server 16 that configures space server 16 to instantiate the virtual space may be provided to space server 16 via the markup language at or near the time of instantiation. Similarly, information transmitted from space server 16 to space client 22 may enable space client 22 to generate views of the virtual space by merely assembling the information indicated in markup elements communicated thereto. The implementation of the markup language may facilitate creation of a new virtual space by the user of space client 22, and/or the customization/refinement of existing virtual spaces.

As used herein, a virtual space may comprise a simulated space (e.g., a physical space) instanced on a server (e.g., space server 16) that is accessible by a client (e.g., space client 22) located remotely from the server to format a view of the virtual space for display to a user. The simulated space may have a topography, express ongoing real-time interaction by the user, and/or include one or more objects positioned within the topography that are capable of locomotion within the topography. In some instances, the topography may be a 2-dimensional topography. In other instances, the topography may be a 3-dimensional topography. In some instances, the topography may be a single node. The topography may include dimensions of the virtual space, and/or surface features of a surface or objects that are "native" to the virtual space. In some instances, the topography may describe a surface (e.g., a ground surface) that runs through at least a substantial portion of the virtual space. In some instances, the topography may describe a volume with one or more bodies positioned therein (e.g., a simulation of gravity-deprived space with one or more celestial bodies positioned therein). A virtual space may include a virtual world, but this is not necessarily the case. For example, a virtual space may include a game space that does not include one or more of the aspects generally associated with a virtual world (e.g., gravity, a landscape, etc.). By way of illustration, the well-known game Tetris may be formed as a two-dimensional topography in which bodies (e.g., the falling tetrominoes) move in accordance with predetermined parameters (e.g., falling at a predetermined speed, and shifting horizontally and/or rotating based on user interaction).

As used herein, the term "markup language" may include a language used to communicate information between components via markup elements. Generally, a markup element is a discrete unit of information that includes both content and attributes associated with the content. The markup language may include a plurality of different types of elements that denote the type of content and the nature of the attributes to be included in the element. For example, in some embodiments, the markup elements in the markup language may be of the form [O_HERE]|objectId|artIndex|x|y|z|name|templateId. This may represent a markup element for identifying a new object in a virtual space. The parameters for the mark-up element include: assigning an object Id for future reference for this object, telling the client what art to draw associated with this object, the relative x, y, and z position of the object, the name of the object, and data associated with the object (comes from the template designated). As another non-limiting example, a mark-up element may be of the form [O_GONE]|objId. This mark-up element may represent an object going away from the perspective of a view of the virtual space. As yet another example, a mark-up element may be of the form [O_MOVE]|objectId|x|y|z. This mark-up element may represent an object that has teleported to a new location in the virtual space. As still another example, a mark-up element may be of the form [O_SLIDE]|objectId|x|y|z|time. This mark-up element may represent an object that is gradually moving from one location in the virtual space to a new location over a fixed period of time. It should be appreciated that these examples are not intended to be limiting, but only to illustrate a few different forms of the markup elements.

Storage module 18 may include an information storage 43, a space server communication module 44, and/or other components. Generally, storage module 18 may store information related to one or more virtual spaces. The information stored by storage module 18 that is related to a given virtual space may include topographical information related to the topography of the given virtual space, manifestation information related to the manifestation of one or more objects positioned within the topography and/or unseen forces experienced by the one or more objects in the virtual space, interface information related to an interface provided to the user that enables the user to interact with the virtual space, space parameter information related to parameters of the virtual space, and/or other information related to the given virtual space.

The manifestation of the one or more objects may include the locomotion characteristics of the one or more objects, the size of the one or more objects, the identity and/or nature of the one or more objects, interaction characteristics of the one or more objects, and/or other aspect of the manifestation of the one or more objects. The interaction characteristics of the one or more objects described by the manifestation information may include information related to the manner in which individual objects interact with and/or are influenced by other objects, the manner in which individual objects interact with and/or are influenced by the topography (e.g., features of the topography), the manner in which individual objects interact with and/or are influenced by unseen forces within the virtual space, and/or other characteristics of the interaction between individual objects and other forces and/or objects within the virtual space. The interaction characteristics of the one or more objects described by the manifestation information may include scriptable behaviors and, as such, the manifestation stored within storage module 18 may include one or both of a script and a trigger associated with a given scriptable behavior of a given object (or objects) within the virtual space. The unseen forces present within the virtual space may include one or more of gravity, a wind current, a water current, an unseen force emanating from one of the objects (e.g., as a "power" of the object), and/or other unseen forces (e.g., unseen influences associated with the environment of the virtual space such as temperature and/or air quality).

The manifestation information related to a given object within the virtual space may include location information related to the given object. The location information may relate to a location of the given object within the topography of the virtual space. In some implementations, the location information may define a location at which the object should be positioned at the beginning of an instantiation of the virtual space (e.g., based on the last location of the object in a previous instantiation, in a default initial location, etc.). In some implementations, the location information may define an "anchor" at which the position of the object within the virtual space may be fixed (or substantially fixed). For example, the object may include a portal object at which a user (and/or an incarnation associated with the user) may "enter" and/or "exit" the virtual space. In such cases the portal object may be substantially unobservable in views of the space (e.g., due to diminutive size and/or transparency), or the portal object may be visible (e.g., with a form that identifies a portal). The user may "enter" the virtual space at a given portal object by accessing a "link" that provides a request to system 10 to provide the user with a view of the virtual space at the given portal object. The link may be accessed at some other location within the virtual space (e.g., at a different portal object within the virtual space), at a location within another virtual space, to initiate entry into any virtual space, or exposed as a URL via the web. If the link is accessed at a location within another virtual space, the operation of system 10 (e.g., as discussed below) may enable the user to view the different virtual space and the given space seamlessly (e.g., without having to open additional or alternative space clients) even though various parameters associated with the different virtual space and the given space may be different (e.g., one or more space parameters discussed below).

In some embodiments, the manifestation information may include information related to the sonic characteristics of the virtual space. For example the information related to the sonic characteristics may include the sonic characteristics of one or more objects positioned in the virtual space. The sonic characteristics may include the emission characteristics of individual objects (e.g., controlling the emission of sound from the objects), the acoustic characteristics of individual objects, the influence of sound on individual objects, and/or other characteristics of the one or more objects. In such embodiments, the topographical information may include information related to the sonic characteristics of the topography of the virtual space. The sonic characteristics of the topography of the virtual space may include acoustic characteristics of the topography, and/or other sonic characteristics of the topography.

Figure 3:
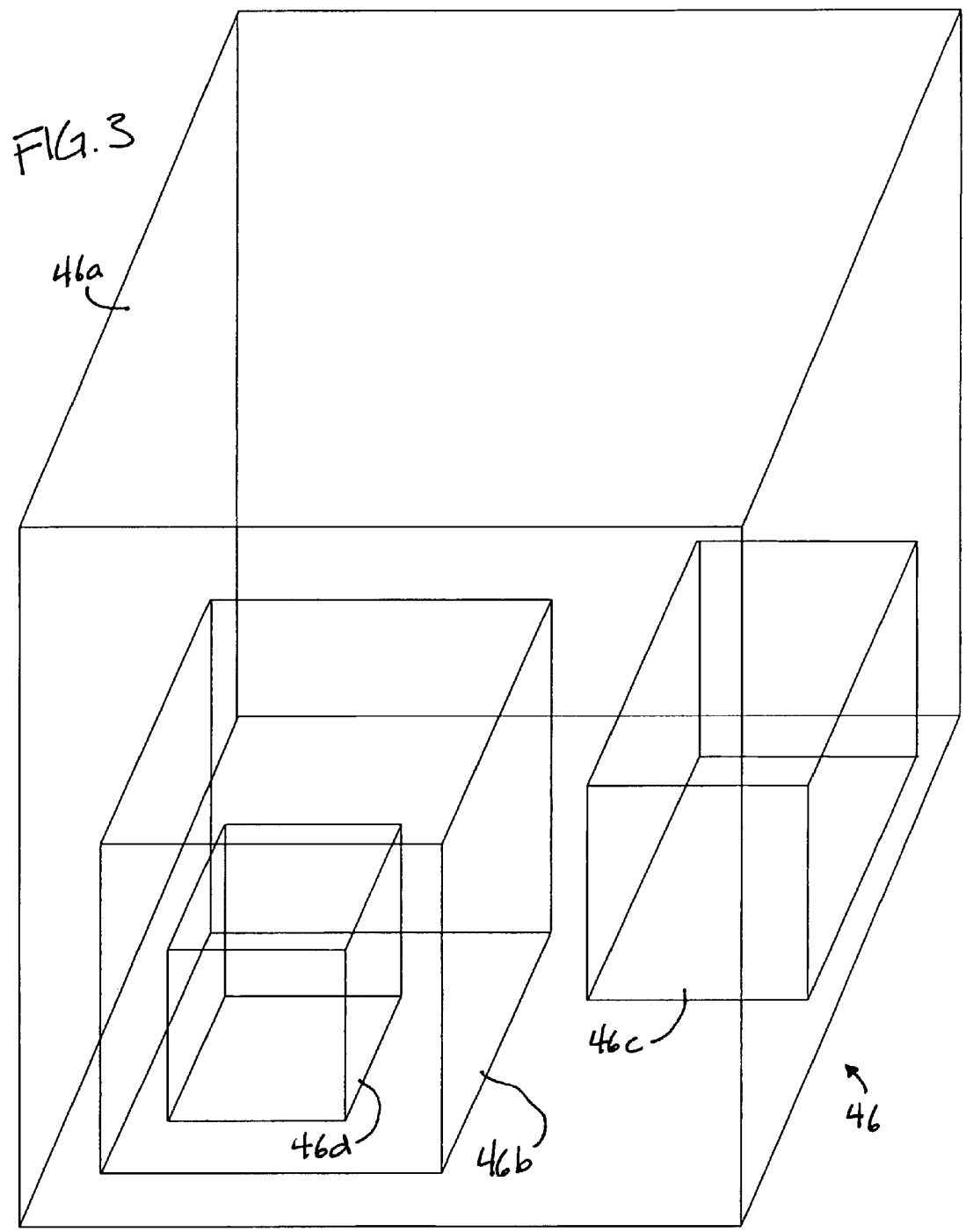
FIG. 3 illustrates a hierarchy of acoustic areas within a virtual space, according to one or more embodiments of the invention.

In some embodiments, the information related to the sonic information may include information related to a hierarchy of acoustic areas within the virtual space. The hierarchy of acoustic areas may include superior acoustic areas, and one or more subordinate acoustic areas that are contained within one of the one or more subordinate acoustic areas. For illustrative purposes, FIG. 3 is provided as an example of a hierarchy of acoustic areas 46 (illustrated in FIG. 3 as an area 46a, an area 46b, an area 46c, and an area 46d). Area 46a of hierarchy 46 may be considered to be a superior acoustic area with respect to each of areas 46b and 46c (which would be considered subordinate to area 46a), since areas 46b and 46c are contained within area 46a. Since areas 46b and 46c are illustrated as being contained within the same superior area (area 36a), they may be considered to be at the same "level" of hierarchy 46. Area 46b, as depicted in FIG. 3 may also be considered to be a superior acoustic area, because area 46d is contained therein (making area 46d subordinate within hierarchy 46 to area 46b). Although not depicted in FIG. 3, it should be appreciated that in some instances, acoustic areas at the same level of hierarchy 46 (e.g., areas 46b and 46c) may overlap with each, without one of the areas being subsumed by the other.

Parameters of the acoustic areas within the hierarchy of acoustic areas may impact the propagation of simulated sounds with the virtual space. Thus, the sound that is audible at a given location within an instance of the virtual space may, at least in part, be a function of one or more of the parameters associated with one or more acoustic areas in which the given location.

The parameters of a given acoustic area may include one or more parameters related to the boundaries of the given acoustic area. These one or more parameters may specify one or more fixed boundaries of the given acoustic area and/or one or more dynamic boundaries of the given acoustic area. For example, one or more boundaries of the given acoustic area may be designated by a parameter to move with a character or object within the virtual space, one or more boundaries may be designated by a parameter to move to expand the given acoustic area (e.g., to include additional conversation participants). This expansion may be based on a trigger (e.g., an additional participant joins an ongoing conversation), based on user control, and/or otherwise determined.

The parameters of a given acoustic area may impact a level (e.g., a volume level) at which sounds generated within the given acoustic area are audible at locations within the given acoustic area. For example, one or more parameters of the given acoustic area may provide an amplification factor by which sounds generated within the given acoustic area are amplified (or dampened), may dictate an attenuation of sound traveling within the given acoustic area (including sounds generated therein), and/or otherwise influence the audibility of sound generated within the given acoustic area at a location within the given acoustic area.

The parameters of a given acoustic area may impact a level (e.g., a volume level) at which sounds generated outside the given acoustic area are audible at locations within the given acoustic area. For example, one or more parameters of the given acoustic area may provide an amplification factor by which sounds generated outside the given acoustic area are amplified (or dampened) when they are perceived within the given acoustic area. In some instances, the one or more parameters may dictate the level of sounds generated outside the given acoustic area in relation to the level of sounds generated within the given acoustic area. For example, referring to FIG. 3, the parameters of area 46c may set the level at which sounds generated within area 46c are perceived within area 46c to be relatively high with respect to the level at which sounds generated outside of area 46c (e.g., within area 46b, outside areas 46b and 46c but within area 46a, etc.) are perceived. This may enable a determination of audible sound at a location within area 46c to be "focused" on locally generated sounds (e.g., participants in a local conversation, sounds related to a game being played or watched, etc.). In instances in which the parameters of area 46c increase the level at which sounds generated outside area 46c (relative to the level of sounds generated within area 46c) are perceived, a determination of audible sound may be more focused on "ambient" or "background" sound. This may enable a listener (e.g., a user viewing the virtual space at a location with area 46c) to monitor more remote goings on within the virtual space by monitoring the sounds generated outside of area 46c. In some instances, the one or more parameters that set the relativity between the levels at which sound generated outside area 46c is perceived versus levels at which sound generated within area 46c is perceived may be wholly defined information stored within storage module 18 (e.g., as manifestation information). In some instances, such parameters of acoustic areas may be manipulated by a user that is viewing an instance of the virtual space (e.g., via an interface discussed below).

The one or more parameters related to the relative levels of perception for sounds generated without and within a given area may include one or more parameters that determine an amount by with sound generated outside the given area is amplified or dampened as such sound passes through a boundary of the given area. Referring again to FIG. 3, such one or more parameters of area 46c may dictate that sounds generated outside of area 46c are dampened substantially as they pass through the boundaries of area 46c. This may effectively increase the relative level of sounds generated locally within area 46c. Alternatively, the one or more parameters of area 46c may dictate that sounds generated outside of area 46c pass through the boundaries thereof without substantial dampening, or even with amplification. This may effectively decrease the relative level of sounds generated locally within area 46c.

In some instances in which a given acoustic area is subordinate to a superior acoustic area within the hierarchy of acoustic areas, the perception of sounds generated outside the given acoustic area may be a function of parameters of both the given acoustic area and its superior. For example, sounds generated within hierarchy 46 shown in FIG. 3 outside of area 46b that are perceived within area 46d must first pass through the boundaries of area 46b and then through the boundaries of 46d. Thus, parameters of both of areas 46b and 46d that impact the level at which sounds generated outside of the appropriate area (46b or 46c) are perceived will have an effect on sounds generated outside of area 46b before being perceived at a location within area 46c.

The one or more parameters of a given acoustic area may relate to an attenuation (or amplification) of sounds generated within the given acoustic area that takes place at the boundaries of the given acoustic area. For example, the one or more parameters may cause substantial (or even complete) absorption of sounds generated within the given acoustic area. This may enhance the "privacy" of sounds generated within the given acoustic area (e.g., of a conversation that takes place therein). In some instances, the one or more parameters may cause amplification of sounds generated within the given acoustic area. This may enable sounds generated within the given acoustic area to be "broadcast" outside of the given acoustic area.

The one or more parameters of a given acoustic area may relate to obtaining access to sounds generated within the given acoustic area. These one or more parameters may preclude an object (e.g., an incarnation associated with a user of the virtual space) from accessing sounds generated within the given acoustic area. This may preclude the object from perceiving sounds according to the other parameters of the given acoustic area. In some instances, this may include physical preclusion of the object from the given acoustic area. In some instances, this may not include physical preclusion, but may none the less preclude sound perceived at the location of the object from being processed according to the parameters of the given acoustic area in determining a view of the virtual space that corresponds to the object. For example, without properly accessing the given acoustic area, the parameters of the given acoustic area maintain the privacy of sounds generated therein (e.g., by substantially or completely attenuating sound generated within the given acoustic area at the boundaries thereof). Thus, sounds perceived at the location of the object (that has not been granted access to the given area) may not include those sound generated within the acoustic area.

Returning to FIG. 1, according to various embodiments, content included within the virtual space (e.g., visual content formed on portions of the topography or objects present in the virtual space, objects themselves, etc.) may be identified within the information stored in storage module 18 by reference only. For example, rather than storing a structure and/or a texture associated with the structure, storage module 18 may instead store an access location at which visual content to be implemented as the structure (or a portion of the structure) or texture can be accessed. In some implementations, the access location may include a URL that points to a network location. The network location identified by the access location may be associated with a network asset 48. Network asset 48 may be located remotely from each of storage module 18, space server 16, and space client 22. For example, the access location may include a network URL address (e.g., an internet URL address, etc.) at which network asset 48 may be accessed.

It should be appreciated that not only solid structures within the virtual space may be identified in the information stored in storage module 18 may be stored by reference. For example, visual effects that represent unseen forces or influences may be stored by reference as described above. Further, information stored by reference may not be limited to visual content. For example, audio content expressed within the virtual space may be stored within storage module 18 by reference, as an access location at which the audio content can be accessed. Other types of information (e.g., interface information, space parameter information, etc.) may be stored by reference within storage module 18.

The interface information stored within storage module 18 may include information related to an interface provided to the user that enables the user to interact with the virtual space. More particularly, in some implementations, the interface information may include a mapping of an input device provided at space client 22 to commands that can be input by the user to system 10. For example, the interface information may include a key map that maps keys in a keyboard (and/or keypad) provided to the user at space client 22 to commands that can be input by the user to system 10. As another example, the interface information may include a map that maps the inputs of a mouse (or joystick, or trackball, etc.) to commands that can be input by the user to system 10. In some implementations, the interface information may include information related to a configuration of a user interface display provided to the user at space client 22 that enables the user to input information to system 10. For example, the user interface may enable the user to input communication to other users interacting with the virtual space, input actions to be performed by one or more objects within the virtual space, request a different point of view for the view, request a more (or less) sophisticated view (e.g., a 2-dimensional view, a 3-dimensional view, etc.), request one or more additional types of data for display in the user interface display, and/or input other information.

The user interface display may be configured (e.g., by the interface information stored in storage module 18) to provide information to the user about conditions in the virtual space that may not be apparent simply from viewing the space. For example, such conditions may include the passage of time, ambient environmental conditions, and/or other conditions. The user interface display may be configured (e.g., by the interface information stored in storage module 18) to provide information to the user about one or more objects within the space. For instance, information may be provided to the user about objects associated with the topography of the virtual space (e.g., coordinate, elevation, size, identification, age, status, etc.). In some instances, information may be provided to the user about objects that represent animate characters (e.g., wealth, health, fatigue, age, experience, etc.). For example, such information may be displayed to the user that is related to an object that represents an incarnation associated with space client 22 in the virtual space (e.g., an avatar, a character being controlled by the user, etc.).

The space parameter information may include information related to one or more parameters of the virtual space. Parameters of the virtual space may include, for example, the rate at which time passes, dimensionality of objects within the virtual space (e.g., 2-dimensional vs. 3-dimensional), permissible views of the virtual space (e.g., first person views, bird's eye views, 2-dimensional views, 3-dimensional views, fixed views, dynamic views, selectable views, etc.), and/or other parameters of the virtual space. In some instances, the space parameter information includes information related to the game parameters of a game provided within the virtual space. For instance, the game parameters may include information related to a maximum number of players, a minimum number of players, the game flow (e.g., turn based, real-time, etc.), scoring, spectators, and/or other game parameters of a game.

In some embodiments, the virtual space may include a plurality of places within the virtual space. Individual places within the virtual space may be delineated by predetermined spatial boundaries that are either fixed or dynamic (e.g., moving with a character or object, increasing and/or decreasing in size, etc.). The places may be delineated from each other because a set of space parameters of a given one of the places may be different than the set(s) of space parameters that correspond to other places in the virtual space. For example, one or more of the rate at which time passes, the dimensionality of objects, permissible points of view, a game parameter (e.g., a maximum or minimum number of players, the game flow, scoring, participation by spectators, etc.), and/or other parameters of the given place may be different than other places. This may enable a single virtual space to include a variety of different "types" of places that can be navigated by a user without having to access a separate virtual space and/or invoke a multitude of space clients. For example, in some instances, a single virtual space may include a first place that is provided primarily for chat, a second place in which a turn-based role playing game with an overhead point of view takes place, a third place in which a real-time first-person shooter game with a character point of view takes place, and/or other places that have different sets of parameters.

The information related to the plurality of virtual spaces may be stored in an organized manner within information storage 43. For example, the information may be organized into a plurality of space records 50 (illustrated as space record 50*a*, space record 50*b*, and space record 50*c*). Individual ones of space records 50 may correspond to individual ones of the plurality of virtual spaces. A given space record 50 may include information related to the corresponding virtual space. In some embodiments, the space records 50 may be stored together in a single hierarchal structure (e.g., a database, a file system of separate files, etc.). In some embodiments, space records 50 may include a plurality of different "sets" of space records 50, wherein each set of space records includes one or more of space records 50 that is stored separately and discretely from the other space records 50.

Although information storage 43 is illustrated in FIG. 1 as a single entity, this is for illustrative purposes only. In some embodiments, information storage 43 includes a plurality of informational structures that facilitate management and storage of the information related to the plurality of virtual spaces. Information storage 43 may include not only the physical storage elements for storing the information related to the virtual spaces but may include the information processing and storage assets that enable information storage 43 to manage, organize, and maintain the stored information. Information storage 43 may include a relational database, an object oriented database, a hierarchical database, a post-relational database, flat text files (which may be served locally or via a network), XML files (which may be served locally or via a network), and/or other information structures.

In some embodiments, in which information storage 43 includes a plurality of informational structures that are separate and discrete from each other, information storage 43 may further include a central information catalog that includes information related to the location of the space records included therein (e.g., network and/or file system addresses of individual space records). The central information catalog may include information related to the location of instances virtual spaces (e.g., network addresses of space servers instancing the virtual spaces). In some embodiments, the central information catalog may form a clearing house of information that enables users to initiate instances and/or access instances of a chosen virtual space. Accordingly, access to the information stored within the central information catalog may be provided to users based on privileges (e.g., earned via monetary payment, administrative privileges, earned via previous game-play, earned via membership in a community, etc.).

Space server communication module 44 may facilitate communication between information storage 43 and space server 16. In some embodiments, space server communication module 44 enables this communication by formatting communication between information storage 43 and space server 16. This may include, for communication transmitted from information storage 43 to space server 16, generating markup elements (e.g., "tags") that convey the information stored in information storage 43, and transmitting the generated markup elements to space server 16. For communication transmitted from space server 16 to information storage 43, space server communication module 44 may receive markup elements transmitted from space server 16 to storage module 18 and may reformat the information for storage in information storage 43.

Space server 16 may be provided remotely from storage module 18. Communication between space server 16 and storage module 18 may be accomplished via one or more communication media. For example, space server 16 and storage module 18 may communicate via a wireless medium, via a hard-wired medium, via a network (e.g., wireless or wired), and/or via other communication media. In some embodiments, space server 16 may include a communication module 52, an instantiation module 54, a view module 56, and/or other modules. Modules 52, 54, and 56 may be implemented in software; hardware; firmware; some combination of software, hardware, and/or firmware; and/or otherwise implemented. It should be appreciated that although modules 52, 54, and 56 are illustrated in FIG. 1 as being co-located within a single unit (space server 16), in some implementations, space server 16 may include multiple units and modules 52, 54, and 56 may be located remotely from the other modules.

Communication module 52 may be configured to communicate with storage module 18 and/or space client 22. Communicating with storage module 18 and/or space client 22 may include transmitting and/or receiving markup elements of the markup language. The markup elements received by communication module 52 may be implemented by other modules of space server 16, or may be passed between storage module 18 and space client 22 via space server 16 (as space server 16 serves as an intermediary therebetween). The markup elements transmitted by communication module 52 to storage module 18 or space client 22 may include markup elements being communicated from storage module to space client 22 (or vice versa), or the markup elements may include markup elements generated by the other modules of space server 16.

Instantiation module 54 may be configured to instantiate a virtual space, which would result in an instance 58 of the virtual space present on space server 16. Instantiation module 54 may instantiate the virtual space according to information received in markup element form from storage module 18. Instantiation module 54 may comprise an application that is configured to instantiate virtual spaces based on information conveyed thereto in markup element form. The application may be capable of instantiating a virtual space without accessing a local source of information that describes various aspects of the configuration of the virtual space (e.g., manifestation information, space parameter information, etc.), or without making assumptions about such aspects of the configuration of the virtual space. Instead, such information may be obtained by instantiation module 54 from the markup elements communicated to space server 16 from storage module 18. This may provide one or more enhancements over systems in which an application executed on a space server instantiates a virtual space (e.g., in "World of Warcraft"). For example, the application included in instantiation module 54 may be capable of instantiating a wider variety of "types" of virtual spaces (e.g., virtual worlds, games, 3-D spaces, 2-D spaces, spaces with different views, first person spaces, birds-eye spaces, real-time spaces, turn based spaces, etc.). Further, it may enable the instantiation of a virtual space by instantiation module 54 that includes a plurality of places, wherein a set of parameters corresponding to a given one of the places may be different (e.g., it may be of a different "type") than the set(s) of space parameters that correspond to other places in the virtual space.

Instance 58 may be characterized as a simulation of the virtual space that is being executed on space server 16 by instantiation module 56. The simulation may include determining in real-time the positions, structure, and manifestation of objects, unseen forces, and topography within the virtual space according to the topography, manifestation, and space parameter information that corresponds to the virtual space. As has been discussed above, various portions of the content that make up the virtual space embodied in instance 58 may be identified in the markup elements received from storage module 18 by reference. In such cases, instantiation module 54 may be configured to access the content at the access location identified (e.g., at network asset 48, as described above) in order to account for the nature of the content in instance 58. Instance 58 may include a plurality of different places instantiated by instantiation module 54 implementing different sets of space parameters corresponding to the different places. The sounds audible at different locations within instance 58 may be determined by instantiation module 54 according to parameters of acoustic areas within the virtual space. The acoustic areas may be organized in a hierarchy, as was discussed above with respect to FIG. 3.

As instance 58 is maintained by instantiation module 54 on space server 16, and the position, structure, and manifestation of objects, unseen forces, and topography within the virtual space varies, instantiation may implement an instance memory module 59 to store information related to the present state of instance 58. Instance memory module 59 may be provided locally to space server 16 (e.g., integrally with space server 16, locally connected with space server 16, etc.), or instance memory module 59 may be located remotely from space server 16 and an operative communication link may be formed therebetween.

View module 56 may be configured to implement instance 58 to determine a view of the virtual space. The view of the virtual space may be from a fixed location or may be dynamic (e.g., may track an object). In some implementations, an incarnation associated with space client 22 (e.g., an avatar) may be included within instance 58. In these implementations, the location of the incarnation may influence the view determined by view module 56 (e.g., track with the position of the incarnation, be taken from the perspective of the incarnation, etc.). The view may be determined from a variety of different perspectives (e.g., a bird's eye view, an elevation view, a first person view, etc.). The view may be a 2-dimensional view or a 3-dimensional view. These and/or other aspects of the view may be determined based on information provided from storage module 18 via markup elements (e.g., as space parameter information). Determining the view may include determining the identity, shading, size (e.g., due to perspective), motion, and/or position of objects, effects, and/ or portions of the topography that would be present in a rendering of the view. The view may be determined according to one or more parameters from to a set of parameters that corresponds to a place within which the location associated with the view (e.g., the position of the point-of-view, the position of the incarnation, etc.) is located. The place may be one of a plurality of places within instance 58 of the virtual space. The sound that is audible in the view determined by view module 56 may be determined based on parameters of one or more acoustic areas in instance 58 of the virtual space.

View module 56 may generate a plurality of markup elements that describe the view based on the determination of the view. The plurality of markup elements may describe identity, shading, size (e.g., due to perspective), and/or position of the objects, effects, and/or portions of the topography that should be present in a rendering of the view. The markup elements may describe the view "completely" such that the view can be formatted for viewing by the user by simply assembling the content identified in the markup elements according to the attributes of the content provided in the markup elements. In such implementations, assembly alone may be sufficient to achieve a display of the view of the virtual space, without further processing of the content (e.g., to determine motion paths, decision-making, scheduling, triggering, etc.).

In some implementations, view module 56 may generate the markup elements to describe a series of "snapshots" of the view at a series of moments in time. The information describing a given "snapshot" may include one or both of dynamic information that is to be changed or maintained and static information included in a previous markup element that will be implemented to format the view until it is changed by another markup element generated by view module 56. It should be appreciated that the use of the words "dynamic" and "static" in this context do not necessarily refer to motion (e.g., because motion in a single direction may be considered static information), but instead to the source and/or content of the information.

In some instances, information about a given object described in a "snapshot" of the view will include motion information that describes one or more aspects of the motion of the given object. Motion information may include a direction of motion, a rate of motion for the object, and/or other aspects of the motion of the given object, and may pertain to linear and/or rotational motion of the object. The motion information included in the markup elements will enable space client 22 to determine instantaneous motion of the given object, and any changes in the motion of the given object within the view may be controlled by the motion information included in the markup elements such that independent determinations by space client 22 of the motion of the given object may not be performed. The differences in the "snapshots" of the view account for dynamic motion of content within the view and/or of the view itself. The dynamic motion controlled by the motion information included in the markup elements generated by view module 56 may describe not only motion of objects in the view relative to the frame of the view and/or the topography, but may also describe relative motion between a plurality of objects. The description of this relative motion may be used to provide more sophisticated animation of objects within the view. For example, a single object may be described as a compound object made up of constituent objects. One such instance may include portrayal of a person (the compound object), which may be described as a plurality of body parts that move relative to each other as the person walks, talks, emotes, and/or otherwise moves in the view (e.g., the head, lips, eyebrows, eyes, arms, legs, feet, etc.). The manifestation information provided by storage module 18 to space server 16 related to the person (e.g., at startup of instance 58) may dictate the coordination of motion for the constituent objects that make up the person as the person performs predetermined tasks and/or movements (e.g., the manner in which the upper and lower legs and the rest of the person move as the person walks). View module 56 may refer to the manifestation information associated with the person that dictates the relative motion of the constituent objects of the person as the person performs a predetermined action. Based on this information, view module 56 may determine motion information for the constituent objects of the person that will account for relative motion of the constituent objects that make up the person (the compound object) in a manner that conveys the appropriate relative motion of the constituent parts, thereby animating the movement of the person in a relatively sophisticated manner.

In some embodiments, the markup elements generated by view module 56 that describe the view identify content (e.g., visual content, audio content, etc.) to be included in the view by reference only. For example, as was the case with markup elements transmitted from storage module 18 to space server 16, the markup elements generated by view module 56 may identify content by a reference to an access location. The access location may include a URL that points to a network location. The network location identified by the access location may be associated with a network asset (e.g., network asset 48). For instance, the access location may include a network URL address (e.g., an internet URL address, etc.) at which network asset 48 may be accessed.

According to various embodiments, in generating the view, view module 56 may manage various aspects of content included in views determined by view module 56, but stored remotely from space server 16 (e.g., content referenced in markup elements generated by view module 56). Such management may include re-formatting content stored remotely from space server 16 to enable space client 22 to convey the content (e.g., via display, etc.) to the user. For example, in some instances, space client 22 may be executed on a relatively limited client platform 12 (e.g., a portable electronic device with limited processing, storage, and/or display capabilities). Similarly, view module 56 may adjust one or more aspects of the view of instance 58 based on a context in which the view will be displayed (e.g., within the limited confines of a banner ad). Space server 16 may be informed of the limited capabilities of client platform 12 and/or the context in which the view will be displayed (e.g., via communication from space client 22 to space server 16) and, in response, view module 56 may access the content stored remotely in network asset 48 to re-format the content (e.g., simplifying visual content, removing some visual content, re-formatting from 3-dimensional to 2-dimensional, etc.) to a form that can be conveyed to the user by client platform 12 executing space client 22 in the appropriate context. In such instances, the re-formatted content may be stored at network asset 48 by over-writing the previous version of the content, stored at network asset 48 separately from the previous version of the content, stored at a network asset 60 that is separate from network asset 48, and/or otherwise stored. In cases in which the re-formatted content is stored separately from the previous version of the content (e.g., stored separately at network asset 48, stored at network asset 24, cached locally by space server 16, etc.), the markup elements generated by view module 56 for space client 22 reflect the access location of the re-formatted content.

As was mentioned above, in some embodiments, view module 56 may adjust one or more aspects of a view of instance 58 based on communication from space client 22 indicating that the capabilities of space client 22 may be limited in some manner and/or the context in which the view is to be displayed dictates that the display may be limited in some manner (e.g., limitations in screen/display size, limitations of screen resolution, limitations of audio capabilities, limitations in information communication speeds, limitations in processing capabilities, etc.). In such embodiments, view module 56 may generate markup elements for transmission that reduce (or increase) the complexity of the view based on the capabilities (and/or lack thereof) and/or context communicated by space client 22 to space server 16. For example, view module 56 may remove audio content from the markup elements, view module 56 may generate the markup elements to provide a two dimensional (rather than a three dimensional) view of instance 58, view module 56 may reduce, minimize, or remove information dictating motion of one or more objects in the view, view module 56 may change the point of view of the view (e.g., from a perspective view to a bird's eye view), and/or otherwise generate the markup elements to accommodate space client 22. In some instances, these types of accommodations for space client 22 may be made by space server 16 in response to commands input by a user on space client 22 as well as or instead of based on communication of space client capabilities and/or context of the display by space client 22. For example, the user may input commands to reduce the load to space client 22 posed by displaying the view to improve the quality of the performance of space client 22 in displaying the view, to free up processing and/or communication capabilities on space client 22 for other functions, and/or for other reasons. From the description above it should be apparent that as view module 56 "customizes" the markup elements that describe the view for space client 22, a plurality of different versions of the same view may be described in markup elements that are sent to different space clients with different capabilities, settings, contexts of display, and/or requirements input by a user. This customization by view module 56 may enhance the ability of system 10 to be implemented with a wider variety of space clients in a wider variety of contexts (e.g., within a banner ad) and/or provide other enhancements.

In some embodiments, space client 22 may include a space server communication module 62, a view display module 64, an interface module 66, and/or other modules. Space server communication module 62 may be configured to receive information related to the execution of instance 58 on space server 16 from space server 16. For example, space server communication module 62 may receive markup elements generated by storage module 18 (e.g., via space server 16), view module 56, and/or other components or modules of system 10. The information included in the markup elements may include, for example, view information that describes a view of instance 58 of the virtual space, interface information that describes various aspects of the interface provided by space client 22 to the user, and/or other information. Space server communication module 62 may communicate with space server 16 via one or more protocols such as, for example, WAP, TCP, UDP, and/or other protocols. The protocol implemented by space server communication module 62 may be negotiated between space server communication module 62 and space server 16.

View display module 64 may be configured to format the view described by the markup elements received from space server 16 for display on display 28. Formatting the view described by the markup elements may include assembling the view information included in the markup elements. This may include providing the content indicated in the markup elements according to the attributes indicated in the markup elements, without further processing (e.g., to determine motion paths, decision-making, scheduling, triggering, etc.). As was discussed above, in some instances, the content indicated in the markup elements may be indicated by reference only. In such cases, view display module 64 may access the content at the access locations provided in the markup elements (e.g., the access locations that reference network assets 38 and/or 60, or objects cached locally to space server 16). In some of these cases, view display module 64 may cause one or more of the content accessed to be cached locally to space client 22, in order to enhance the speed with which future views may be assembled. The view that is formatted by assembling the view information provided in the markup elements may then be conveyed to the user via display 28.

As has been mentioned above, in some instances, the capabilities of space client 22 may be relatively limited and/or the context of the display of the view by space client 22 may be limited by its context. In some such instances, space client 22 may communicate these limitations to space server 16, and the markup elements received by space client 22 may have been generated by space server 16 to accommodate the communicated limitations. However, in some such instances, space client 22 may not communicate some or all of the limitations that prohibit conveying to the user all of the content included in the markup elements received from space server 16. Similarly, space server 16 may not accommodate all of the limitations communicated by space client 22 as space server 16 generates the markup elements for transmission to space client 22. In these instances, view display module 64 may be configured to exclude or alter content contained in the markup elements in formatting the view. For example, view display module 64 may disregard audio content if space client 22 does not include capabilities for providing audio content to the user, or if such provision is not appropriate. As another example, if space client 22 does not have the processing and/or display resources to convey movement of objects in the view, view display module 66 may restrict and/or disregard motion dictated by motion information included in the markup elements.

Interface module 66 may be configured to configure various aspects of the interface provided to the user by space client 22. For example, interface module 66 may configure a user interface provided on display 28 and/or input interface 30 according to the interface information provided in the markup elements. As was discussed above, the user interface configured on display 28 by interface module 66 may enable the user to input communication to other users interacting with the virtual space, input actions to be performed by one or more objects within the virtual space, provide information to the user about conditions in the virtual space that may not be apparent simply from viewing the space, provide information to the user about one or more objects within the space, and/or provide for other interactive features for the user. In some implementations, the markup elements that dictate aspects of the user interface may include markup elements generated at storage module 18 (e.g., at startup of instance 58) and/or markup elements generated by space server 16 (e.g., by view module 56) based on the information conveyed from storage module 18 to space server 16 via markup elements.

In some instances, interface module 66 may configure input interface 30 according to information received from space server 16 via markup elements. For example, interface module 66 may map the manipulation of input interface 30 by the user into commands to be input to system 10 based on a predetermined mapping that is conveyed to space client 22 from space server 16 via markup elements. The predetermined mapping may include, for example, a key map and/or other types of interface mappings (e.g., a mapping of inputs to a mouse, a joystick, a trackball, and/or other input devices). If input interface 30 is manipulated by the user, interface module 66 may implement the mapping to determine an appropriate command (or commands) that correspond to the manipulation of input interface 30 by the user. Similarly, information input by the user to input interface 30 (e.g., via a command line prompt) may be formatted into an appropriate command for system 10 by interface module 66. In some instances, the availability of certain commands, and/or the mapping of such commands may be provided based on privileges associated with a user manipulating space client 22 (e.g., as determined from a login). For example, a user with administrative privileges, premium privileges (e.g., earned via monetary payment), advanced privileges (e.g., earned via previous game-play), and/or other privileges may be enabled to access an enhanced set of commands. These commands formatted by interface module 66 may be communicated to space server 16 by space server communication module 62.

Upon receipt of commands from space client 22 that include commands input by the user (e.g., via communication module 52), space server 16 may enqueue for execution (and/or execute) the received commands. The received commands may include commands related to the execution of instance 58 of the virtual space. For example, the commands may include display commands (e.g., pan, zoom, etc.), object manipulation commands (e.g., to move one or more objects in a predetermined manner), incarnation action commands (e.g., for the incarnation associated with space client 22 to perform a predetermined action), communication commands (e.g., to communicate with other users interacting with the virtual space), and/or other commands. Instantiation module 54 may execute the commands in the virtual space by manipulating instance 58 of the virtual space. The manipulation of instance 58 in response to the received commands may be reflected in the view generated by view module 56 of instance 58, which may then be provided back to space client 22 for viewing. Thus, commands input by the user at space client 22 enable the user to interact with the virtual space without requiring execution or processing of the commands on space client 22 itself.

Figure 4:
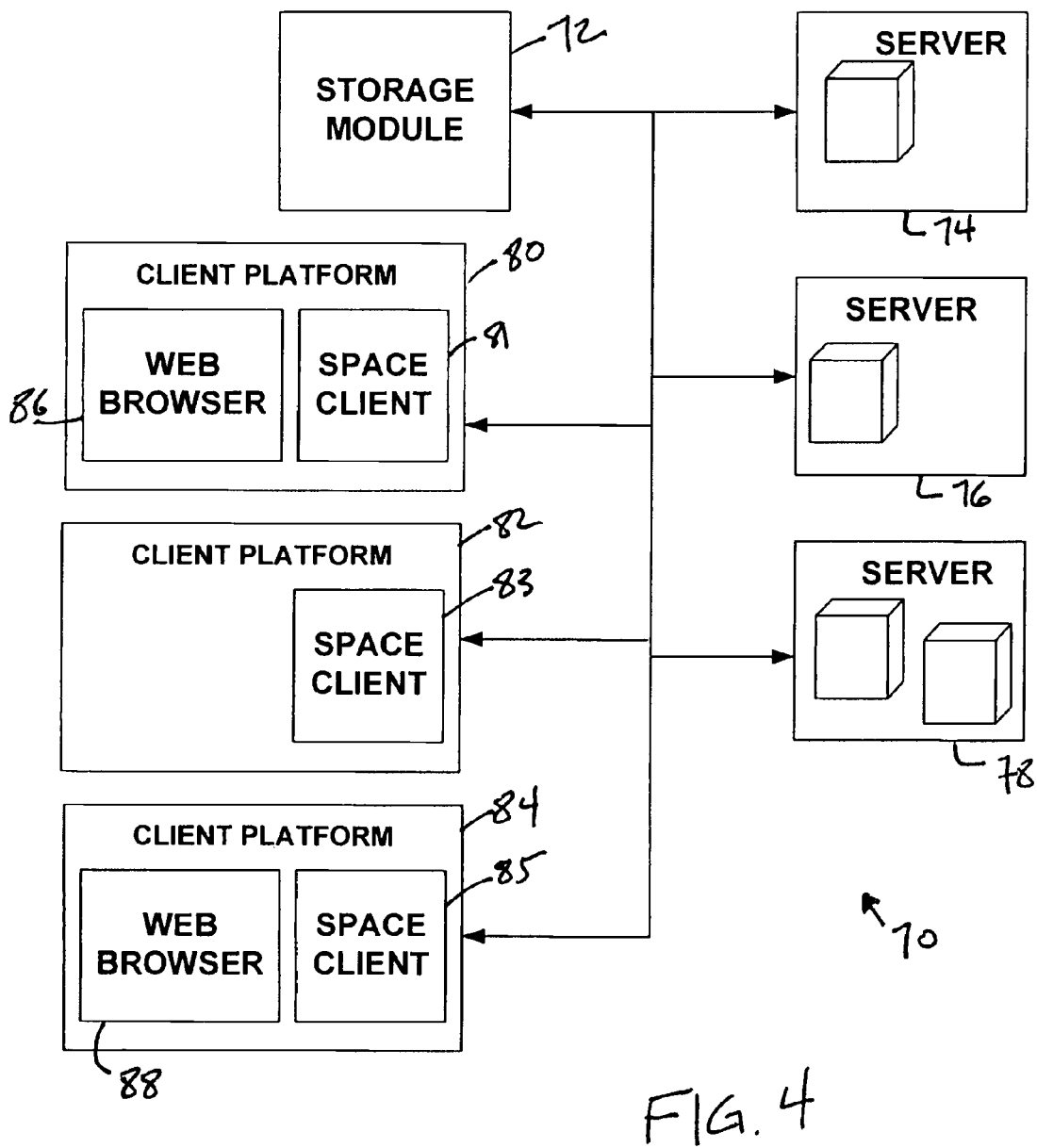
FIG. 4 illustrates a system configured to provide one or more virtual spaces that may be accessible to users, according to one or more embodiments of the invention.

It should be that system 10 as illustrated in FIG. 1 is not intended to be limiting in the numbers of the various components and/or the number of virtual spaces being instanced. For example, FIG. 4 illustrates a system 70, similar to system 10, including a storage module 72, a plurality of space servers 74, 76, and 78, and a plurality of client platforms 80 (executing space client 81), 82 (executing space client 83), and 84 (executing space client 85). Storage module 72 may perform substantially the same function as storage module 18 (shown in FIG. 1 and described above). Space servers 74, 76, and 78 may perform substantially the same function as space server 16 (shown in FIG. 1 and described above). Space clients 81, 83, and 85 may perform substantially the same function as space client 22 (shown in FIG. 1 and described above). One or more of space clients 81, 83, and 85 (e.g. space clients 81 and 85 in FIG. 4) may be invoked by another application, such as a web browser (illustrated as web browsers 86 and 88 operating on client platforms 80 and 84 within FIG. 4). For example, space clients 81 and 85 may have been invoked by web browsers 86 and 88 to provide views of one or more virtual spaces within banner ads.

Storage module 72 may store information related to a plurality of virtual spaces, and may communicate the stored information to space servers 74, 76, and/or 78 via markup elements of the markup language, as was discussed above. Space servers 74, 76, and/or 78 may implement the information received from storage module 72 to execute instances 90, 92, 94, and/or 96 of virtual spaces. As can be seen in FIG. 4, a given space server, for example, space server 78, may be implemented to execute instances of a plurality of virtual spaces (e.g., instances 94 and 96). Space clients 81, 83, and 85 may receive information from space servers 74, 76, and/or 78 that enables space clients 81, 83, and/or 85 to provide an interface for users thereof to one or more virtual spaces being instanced on space servers 74, 76, and/or 78. The information received from space servers 74, 76, and/or 78 may be provided as markup elements of the markup language, as discussed above.

Due at least in part to the implementation of the markup language to communicate information between the components of system 70, it should be appreciated from the foregoing description that any of space servers 74, 76, and/or 78 may instance any of the virtual spaces stored on storage module 72. The ability of space servers 74, 76, and/or 78 to instance a given virtual space may be independent, for example, from the topography of the given virtual space, the manner in which objects and/or forces are manifest in the given virtual space, and/or the space parameters of the given virtual space. This flexibility may provide an enhancement over conventional systems for instancing virtual spaces, which may only be capable of instancing certain "types" of virtual spaces. Similarly, space clients 81, 83, and/or 85 may interface with any of the instances 90, 92, 94, and/or 96. Such interface may be provided without regard for specifics of the virtual space (e.g., topography, manifestations, parameters, etc.) that may limit the number of "types" of virtual spaces that can be provided for with a single space client in conventional systems. In conventional systems, these limitations may arise as a product of the limitations of platforms executing space client 22, limitations of space client 22 itself, and/or other limitations.

Returning to FIG. 1, in some embodiments, system 10 may enable the user to customize a virtual space by adding and/or editing content (e.g., visual content, audio content, etc.). Content may be added to a space by the user in a variety of manners. For instance, content may be created within the context of space client 22 or content may be accessed (e.g., on a file system local to space client 22) and uploaded to space server 16 and/or storage module 18. In some instances, content added to the virtual space may include content from another virtual space, content from a webpage, or other content stored remotely from space client 22. In these instances, an access location associated with the new content may be provided to space module 16 and/or storage module 18 (e.g., a network address, a file system address, etc.) so that the content can be implemented during instantiation of the virtual space to provide views of the virtual space (e.g., by view module 56 and/or view display module 64 as discussed above) with the new content. This may enable the user to identify content for inclusion in the virtual space from virtually any electronically available source of content without the content selected by the user to be uploaded for storage on storage module 18, or to space server 16 during instantiation (e.g., except for temporary caching in some cases), or to space client 22 during display (e.g., except for temporary caching in some cases).

Figure 5:
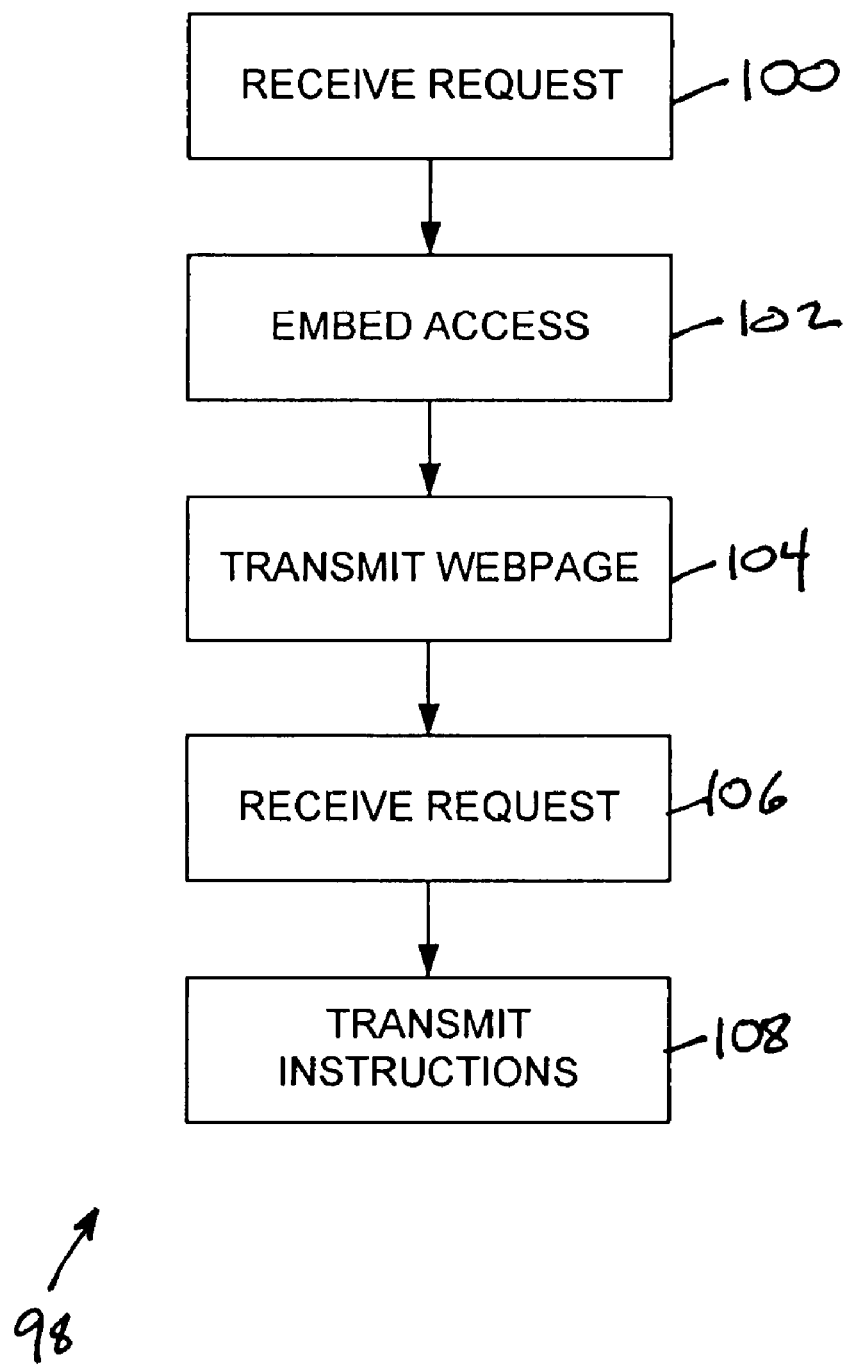
FIG. 5 illustrates a method of providing a view of a virtual space within a banner ad, according to one or more embodiments of the invention.

FIG. 5 illustrates a method 98 of providing a view of a virtual space within a banner ad, according to one or more embodiments of the invention. In particular, the operations of method 98 may be executed by one or more web servers similar to one or more web servers 14 of system 10 illustrated in FIG. 1 and described above. However it should be appreciated that this is not intended to be limiting, as other components and/or systems may implement method 98 without departing from the scope of this disclosure.

Method 98 includes an operation 100 at which a request is received for a webpage. The request may be received from a web browser. The webpage may include one or more banner areas where advertising content (e.g., banner ads) can be embedded into the webpage.

In response to the request received at operation 100, at an operation 102 access to a virtual space may be embedded in a banner area of the webpage. Embedding access to the virtual space may include providing instructions associated with the webpage that (i) instruct the web browser to invoke a space client that is capable of formatting a view of the virtual space and (ii) instruct the space client to request information related to a view of the virtual space that corresponds to a predetermined location in the virtual space. The instructions to invoke the space client may include an actual copy of the space client to be invoked. In some implementations, providing instructions associated with the webpage may comprise including, with content associated with the webpage, a network location at which the instructions are accessible.

At an operation 104 the webpage, including the instructions provided at operation 102 (e.g., by referencing the network location), may be transmitted to the web browser. At an operation 106 a request is received at the network location for the instruction. The request may be received from the web browser in response to the transmission of the webpage. At an operation 108, the request received at operation 106 is responded to by transmitting the instructions discussed above (with respect to operation 102) to the web browser.

Figure 6:
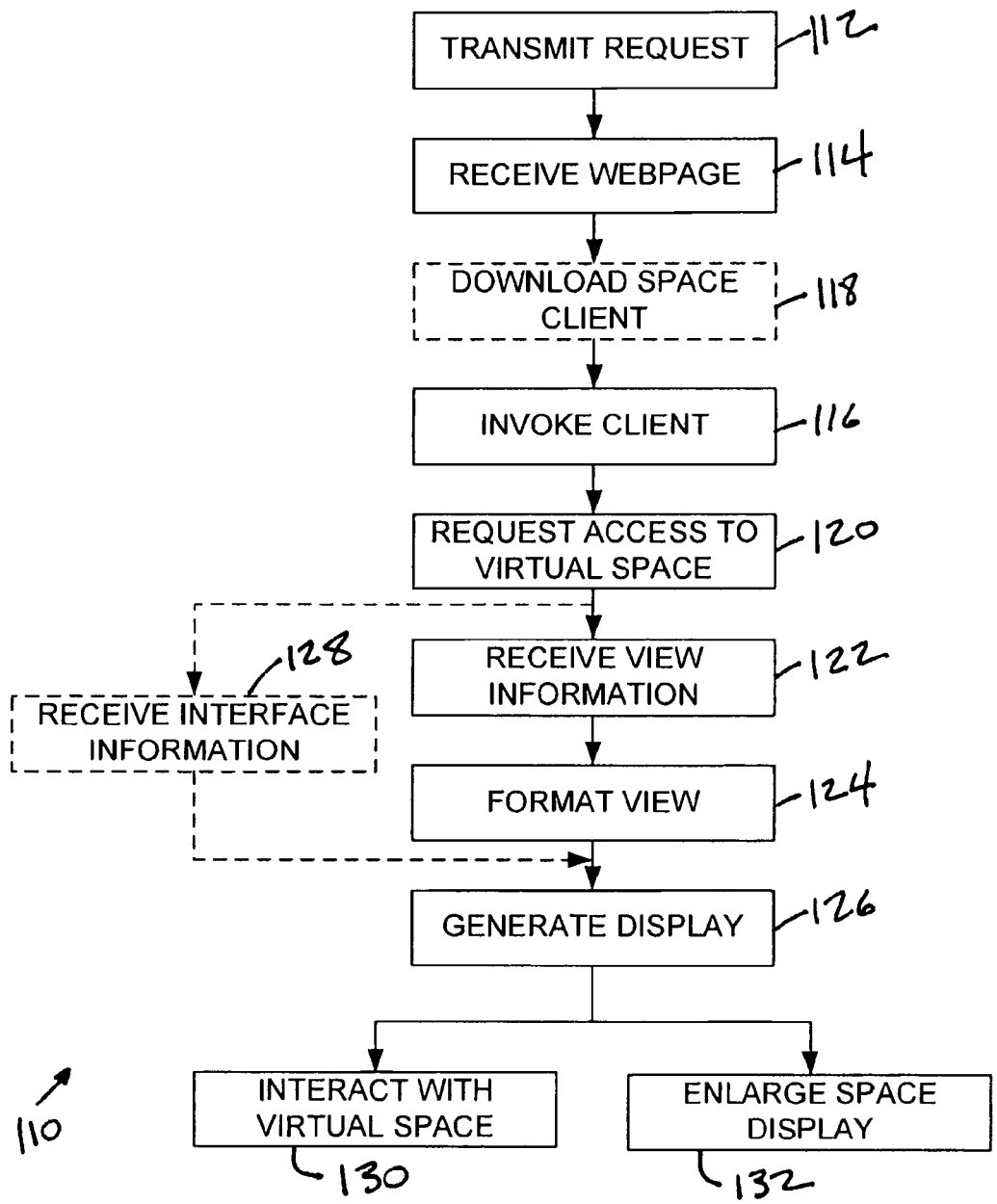
FIG. 6 illustrates a method of providing a view of a virtual space within a banner ad, according to one or more embodiments of the invention.

FIG. 6 illustrates a method 110 of providing a view of a virtual space within a banner ad, according to one or more embodiments of the invention. In particular, the operations of method 110 may be executed by a client platform similar to client platform 12, illustrated in FIG. 1 and described above (e.g., including web browser 20 and space client 22). However it should be appreciated that this is not intended to be limiting, as other components and/or systems may implement method 110 without departing from the scope of this disclosure.

At an operation 112 in method 110, a request may be transmitted for a webpage. The request may be transmitted to one or more web servers associated with the webpage and/or content included therein. The webpage may include one or more banner areas where advertising content (e.g., banner ads) can be embedded into the webpage.

At an operation 114 the webpage may be received with instructions to provide a view of a virtual space embedded in a banner area of the webpage. In some implementations, operation 114 may include receiving in the webpage a network location at which the instructions are accessible (e.g., from an ad server), transmitting a request for the instructions to the network location, and receiving the instructions. The instructions may include instructions to invoke a space client, and instructions to the space client regarding the virtual space to be viewed, and/or a predetermined location in the appropriate virtual space to be viewed. The instructions to invoke the space client may include an actual copy of the space client to be invoked.

At an operation 116 the space client may be invoked. The space client may be capable of requesting view information related to the view of the virtual space that corresponds to the predetermined location from a space server associated with the virtual space at an operation 120. The space server may be similar to space server 16 described above and illustrated in FIG. 1.

At an operation 122, receiving view information from the space server that corresponds to a view determined by the space server from an instance of the virtual space being instanced on the space server. Based on the received view information, a view of the virtual space may be formatted (e.g., by the space client) at an operation 124 by assembling the view information received at operation 122.

At an operation 126 a display of the webpage may be generated that includes the formatted view of the virtual space (e.g., formatted at operation 124) in the appropriate banner area. In some implementations, the display generated at operation 126 may include a user interface that is generated based on interface information received from the space server at an operation 128.

At an operation 130, one or more commands input via the user interface may be executed in the virtual space (e.g., by the space server). These commands may include interactions by a user of the web browser with the virtual space (e.g., one or more objects within the virtual space). The portion of the display in which the view of the virtual space is conveyed may be enlarged at an operation 132, in response to a user selection and/or command.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it should be understood that the present invention contemplates that, to the extent possible, one or more features of any embodiment can be combined with one or more features of any other embodiment.

What is claimed is:

1. A system configured to embed a view of at least a portion of a virtual space in a banner ad, the system comprising:
   one or more physical processors configured to execute an ad server, the ad server being configured:
   to receive a request for content for a banner ad in a webpage to be displayed on a client device of a user;
   to receive identification information associated with the user;
   to access user information related to the user, responsive to reception of the request and the identification information;
   to determine a view location in a virtual space based on the user information; and
   to transmit instructions to the client device that will cause the client device to request, for presentation in the banner ad of the webpage, a view of the virtual space that corresponds to the determined view location from a virtual space server, wherein the virtual space is a persistent, simulated space that has a topography, expresses real-time interaction by one or more users, and includes one or more objects positioned within the topography that are capable of experiencing locomotion within the topography.

2. The system of claim 1, wherein the ad server is further configured such that the user information used to determine the view location include virtual space user account information for the user.

3. The system of claim 2, wherein the ad server is configured such that the view location is determined based on the user information corresponds to a location in the virtual space of a character previously utilized by the user in the virtual space.

4. The system of claim 1, wherein the ad server is further configured such that the user information used to determine the view location includes demographic information.

5. The system of claim 4, wherein the demographic information includes one or more of sex, age, family status, income, or occupation.

6. The system of claim 1, wherein the ad server is further configured to determine a specific virtual space and then to determine the view location within the specific virtual space.

7. A method of embedding a view of at least a portion of a virtual space in a banner ad, the method being implemented in one or more physical processors configured to execute an ad server, the method comprising:
receiving a request for content for a banner ad in a webpage to be displayed on a client device of a user;
receiving identification information associated with the user;
accessing user information related to the user, responsive to reception of the request and the identification information;
determining a view location in a virtual space based on the user information; and
transmitting instructions to the client device that will cause the client device to request, for presentation in the banner ad of the webpage, a view of the virtual space that corresponds to the determined view location in the virtual space from a virtual space server, wherein the virtual space is a persistent, simulated space that has a topography, expresses real-time interaction by one or more users, and includes one or more objects positioned within the topography that are capable of experiencing locomotion within the topography.

8. The method of claim 7, wherein the user information used to determine the view location includes virtual space user account information for the user.

9. The method of claim 8, wherein the view location determined based on the user information corresponds to a location in the virtual space of a character previously utilized by the user in the virtual space.

10. The method of claim 7, wherein the user information used to determine the view location includes demographic information.

11. The method of claim 10, wherein the demographic information includes one or more of sex, age, family status, income, or occupation.

12. The method of claim 7, wherein the view location is determined by identifying a specific virtual space and then determining the view location within the specific virtual space.

13. A method of embedding a view of at least a portion of a virtual space in a banner ad, the method being implemented in a client device of a user, the client device comprising one or more physical processors configured to execute computer program modules, the method comprising:
transmitting a request for a webpage to one or more web servers, wherein the webpage includes one or more banner areas where advertising content can be embedded into the webpage;
receiving the webpage from the one or more web servers with instructions to present a virtual space embedded in a banner area of the webpage, wherein the virtual space is a persistent, simulated space that has a topography, expresses real-time interaction by one or more users, and includes one or more objects positioned within the topography that are capable of experiencing locomotion within the topography;
generating a virtual space request to a space server, wherein the space server executes an instance of a virtual space and implements the executed instance of the virtual space (i) to determine a view of the virtual space, and (ii) to determine view information that describes the determined view, wherein the view corresponds to a view location in the virtual space, and wherein the view location is determined for the user based on user information related to the user;
receiving the view information from the space server;
formatting the view of the virtual space for display in the banner area of the webpage by assembling the view information; and
generating a display of the webpage that includes the formatted view of the virtual space in the banner area.

14. The method of claim 13, wherein receiving the webpage from the one or more web servers with the instructions to present a virtual space embedded in a banner area of the webpage comprises:
receiving in the webpage a network location corresponding to an ad server included in the one or more web servers at which the instructions to present the virtual space are accessible;
transmitting a request for the instructions to the ad server at the network location; and
receiving the instructions from the ad server.

15. The method of claim 14, further comprising transmitting identification information associated with the user and/or the user information to the one or more web servers.

16. The method of claim 13, wherein the virtual space request comprises identification information identifying the user to facilitate determination of the view location by the space server.

17. The method of claim 13, wherein the user information used to determine the view location includes virtual space user account information for the user.

18. The method of claim 13, wherein the view location determined based on the user information corresponds to a location in the virtual space of a character previously utilized by the user in the virtual space.

19. The method of claim 13, wherein the user information used to determine the view location includes demographic information.

20. The method of claim 13, wherein the view location is determined by identifying a specific virtual space and then determining the view location within the specific virtual space.

21. The method of claim 13, further comprising expanding the size of the view in the generated display based on an input from a user.

* * * * *